United States Patent [19]
Basteck

[11] Patent Number: 5,788,431
[45] Date of Patent: Aug. 4, 1998

[54] DRILLING TOOL

[75] Inventor: Andreas Basteck, Freiburg, Germany

[73] Assignee: August Beck GmbH & Co., Winterlingen, Germany

[21] Appl. No.: 667,217

[22] Filed: Jun. 21, 1996

[30] Foreign Application Priority Data

Jun. 23, 1995 [DE] Germany ............ 195 22 837.5

[51] Int. Cl.⁶ ................................. B23B 51/00
[52] U.S. Cl. ............. 408/229; 408/143; 408/227; 408/713; 408/59
[58] Field of Search ............... 408/143, 227, 408/229, 230, 705, 713, 57, 59, 199, 223–225; 175/394

[56] References Cited

U.S. PATENT DOCUMENTS

| | | | |
|---|---|---|---|
| 190,907 | 5/1877 | Goddard | 408/229 |
| 2,360,385 | 10/1944 | Anderson | 408/59 |
| 4,340,327 | 7/1982 | Martins | 408/59 |
| 5,354,156 | 10/1994 | Von Haas et al. | 408/713 |

FOREIGN PATENT DOCUMENTS

| | | | |
|---|---|---|---|
| 213911 | 9/1987 | Japan | 408/227 |
| 142117 | 6/1991 | Japan | 408/230 |
| 184707 | 8/1991 | Japan | 408/230 |
| 4244311 | 9/1992 | Japan | 408/230 |
| 562389 | 6/1977 | U.S.S.R. | 408/230 |

*Primary Examiner*—Steven C. Bishop

[57] ABSTRACT

The invention relates to a drilling tool (11), comprising a drill shank (22) which has an inner chip space (13) and an outer chip space (14) which extend axially along the drill shank (22) and which in each case accommodate at least one indexable insert (21, 22), the drill shank (12) having a left-hand twist for damping vibrations and increasing the cutting capacity.

33 Claims, 6 Drawing Sheets

 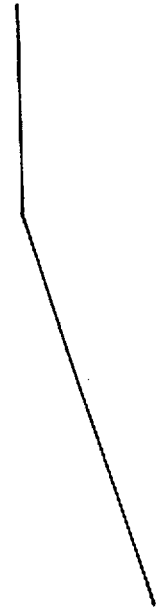  
Fig 8a     Fig. 8b     Fig. 8c     Fig. 8d
   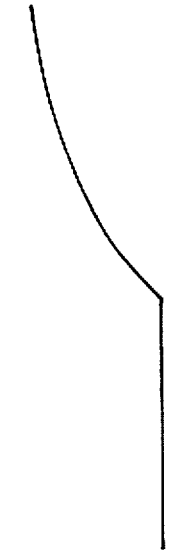
Fig. 8e     Fig. 8f     Fig. 8g     Fig. 8h

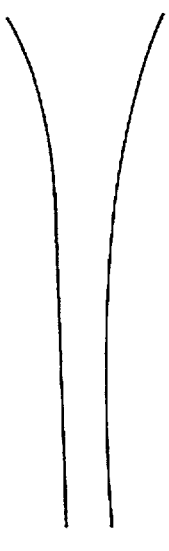
Fig. 9a　　　Fig. 9b　　　Fig. 9c　　　Fig. 9d
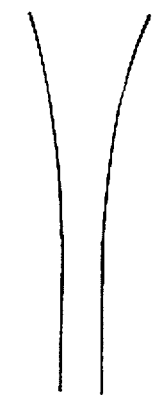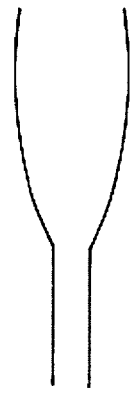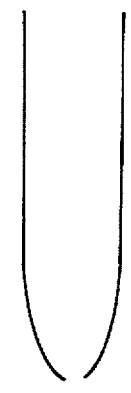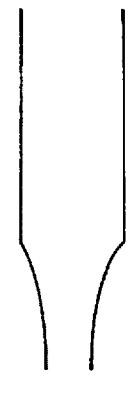
Fig. 9e　　Fig. 9f　Fig. 9g　Fig. 9h　Fig. 9i

DRILLING TOOL

BACKGROUND OF THE INVENTION

1. Field of the Invention

The invention relates to a drilling tool for bores in solid metal material.

2. Discussion of Prior Art

EP-A 0 054 913 discloses a drilling tool having radial compensation of the cutting forces, the drill shank of which drilling tool is provided with at least two receptacles which are offset at equal peripheral angular distances and in which in each case an interchangeable indexable insert having cutting edges of the same length is arranged in the radial direction. The working areas of the indexable inserts overlap at least partly, the radially inner indexable insert slightly overlapping the drill axis with its one engaged cutting edge. An angle bisector lying between the engaged cutting edges is inclined by an angle α relative to the drill longitudinal axis. By uniform inclination of the angle bisectors of the radially inner and radially outer indexable inserts and by a drilling-tool basic body designed with a right-hand twist, the cutting forces resulting on the drill shank are supposed to cancel each other out so that full force compensation of the drill shank in the radial direction can be achieved.

On account of the full force compensation of the drill shank in the radial direction, the drill shank can be prevented from running out of the drill axis; however, withdrawal scores may occur when the drill is moved out of the drill hole.

To remedy the above disadvantages, EP-B 0 532 532 discloses a drilling tool in which an indexable-insert arrangement is intentionally selected in which the sum of the radial-force components resulting from all effective cutting edges in engagement is different from zero. Drill holes can thereby be cut whose diameter is slightly larger than the drill diameter. The drilling tool cannot jam in the bores and the withdrawal scores can be avoided when pulling out the drill shank.

However, these drilling tools have the disadvantage that, on account of their design, they are susceptible to increased vibrations when drilling in solid material. This becomes clear from visible chatter marks at the bottom of the drill hole. Such vibrations lead to the need for an increased cutting force in order to remove material, as a result of which the resulting force also increases. Furthermore, the latter increases with increasing drill-hole depth, as a result of which the working relationships have to be adapted in order to avoid a fracture of the drilling tool. In addition, an increased feed force is necessary in order to remove material. Furthermore, it is disadvantageous that the increased vibration leads to a noise nuisance as well as to the partial excitation of vibrations in the entire drilling machine.

SUMMARY OF THE INVENTION

The object of the invention is to further develop the drilling tool as defined in the preamble so that at least a low-vibration configuration of a drilling tool and an increase in the cutting capacity are made possible.

This object is achieved according to the invention by a drilling tool having a drill shank which has at least one axially extending recess and at least two indexable inserts that are arranged at a different radial distance from the drill longitudinal axis on the end-face of the drill shank. The indexable inserts are at least similar geometrically and have working areas that overlap. Each of the inserts has two cutting edges that are of the same length, are inclined adjacent to one another, are at an obtuse angle to one another, and are in cutting engagement simultaneously. The radially inner indexable insert slightly overlaps the drill longitudinal axis with its one engaged cutting edge. The radially outer indexable insert slightly overlaps the circumferential surface of the drill shank with its one engaged cutting edge. At least one of the angle bisectors of the two cutting edges of an indexable insert is rotated by an angle (α) relative to the drill longitudinal axis. The front area of the drill shank has a left-hand twist relative to the rear area of the drill shank as viewed in the direction of rotation. Unlike the drilling tools according to the prior art shown at the beginning, the right-hand twist of the cutting-edge arrangement on a basic body of a drill is dispensed with. The basic body of the drill is provided with a left-hand twist, which leads to considerable damping of vibrations in the drilling tool. On account of the left-hand twist, the basic body of the drilling tool is stressed in tension, in contrast to a basic body designed with a right-hand twist, on which compressive stresses are exerted during the cutting operation. These compressive stresses lead to chatter marks at the bottom of the drill hole, which in turn show that a temporarily increased stress occurs which then forms the indentation of the chatter mark and jumps further to the next indentation on account of an intermediate relief phase. In contrast to this, it becomes clear when considering the engagement point of the cutting edge that the cutting edge is pulled against the cutting force in the case of the left-hand twist and is not compressed as in the case of the right-hand twist. Consequently, no tilting moment can develop and, therefore no excitation of vibrations can be caused.

The design of the left-hand twist, which is at least different from zero degrees, causes the main inertia axis of the drill to be put into the area of the force component having the greatest vibration potential and of the resulting force, i.e. the main inertia axis is oriented to the area of the cutting edge of the outer insert. The profile cross-section of the basic body is thereby rotated at the same time in the direction of the main section modulus. The force component having the greatest vibration potential thereby lies essentially in the main inertia axis, as a result of which damping of vibrations is likewise permitted.

In addition, due to the configuration according to the invention of the basic body by means of a left-hand twist, an increase in the rigidity of the drilling tool can also be achieved, since a low vibration load acts on the drilling tool.

Furthermore, the drill may have a discontinuous left-hand twist, which enables the main inertia axis to turn in at an earlier moment in the plane of the force component having the greatest vibration potential, so that the greatest main section modulus in the plane described above is not present only in the runout area of the chip grooves of the support body. The main inertia axis of the drill can reach this plane in the last third ±20% and remains in this position, which results in a rectilinear further course of the chip grooves.

A further configuration according to the invention for increasing the rigidity of the drilling tool is provided by a core rise of the basic body in the rear area of the drill shank. The cross-section lying in the rear area of the drill shank can be enlarged by up to 10% in relation to the cross-section of the shank in the front area, the cross-sectional enlargement being dimensioned in such a way that a chip space narrowing to the rear is not made too small so that the chips to be discharged can be discharged via the chip space without problem.

A further configuration according to the invention of the basic body for increasing the rigidity is provided by the design of a stiffening bead on a side surface of the chip space, which stiffening bead is arranged opposite a side surface accommodating an indexable insert. The design of the stiffening bead in the outer area of the side surface of the chip space enables the section modulus as well as the moment of inertia of the basic body of the drill to be increased. The stiffening bead advantageously extends from an end face of a flank of the drill up to the runout area of the chip space.

In a further configuration according to the invention of a drilling tool for increasing its rigidity, provision is made for the cross-section of the basic body to be optimized by a very large chip space being formed, the section modulus and the moment of inertia being increased at the same time. In cross-section, the basic body has two diametrically opposite, essentially quadrant-shaped solid cross-sectional segments which form the chip spaces inbetween. In this arrangement, the cross-sections overlap the first and third quadrants as viewed essentially in an X-Y axis system. Here, the second and fourth quadrants form the chip space. Provision is advantageously made here for the stiffening bead to be provided at the same time on the one side surface of the chip space.

A further advantageous configuration of the invention for damping vibrations is provided by the configuration of an optimized chip flow. The latter is ensured by virtue of the fact that a sloping surface formed to an absolute minimum is provided as an edge cut in the transition area of a main flank of the drilling tool to a side surface of the chip space, which sloping surface is designed as a surface inclined relative to the side surface of the chip space. This edge cut is advantageously designed as a bevel and extends only a few millimeters from an end edge of the main flank into the side surface of the recess. Consequently, in contrast to a previous edge cut extending over a very large area and length in the direction of the rear area, further excitation of vibrations can be prevented, which has been caused by the chip space having an overall constriction at the transition from the edge cut to the side surface of the recess, as a result of which the chip is pressed against the bore wall. Additional forces are thereby produced, which in turn react upon the drill and attempt to deflect the latter, as a result of which excitation of vibrations occurs. On account of the edge cut of very small design, the removed chip is conveyed from the front area of the drill shank to the rear via a chip space of constant cross-section, so that no additional forces are produced and no disturbances occur in the front area of the drill shank.

For damping vibrations and/or increasing the rigidity, the drilling tool according to the invention may have a left-hand twist, a core rise, a stiffening strip, an edge cut of small design as well as a basic-body geometry having two essentially diametrically opposite, quadrant-shaped solid cross-sections and may also be designed in any desired combination having one or more features preferred for damping vibrations and/or increasing the rigidity.

Further advantageous embodiments and further developments of the invention are given by the features of the sub-claims and are described in more detail below.

BRIEF DESCRIPTION OF THE DRAWINGS

A preferred exemplary embodiment is shown in the drawings in which:

FIGS. 8a–8h show a schematic side view of a drilling tool according to the invention with a discontinuous left-hand twist;

FIGS. 9a–9i show a schematic side view of a drilling tool according to the invention with a discontinuous core rise.

DETAILED DESCRIPTION OF A PREFERRED EMBODIMENT

Figure 1:
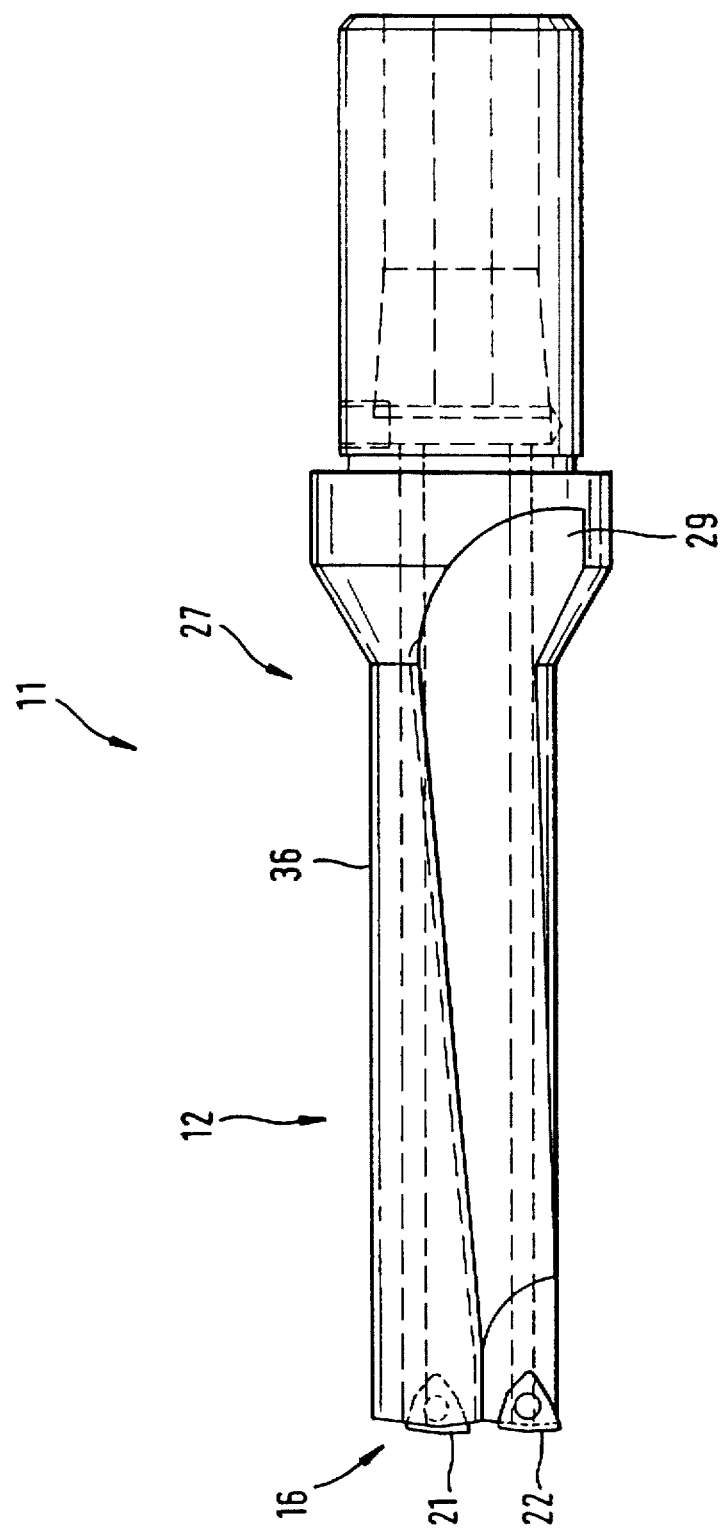
FIG. 1 shows a schematic side view of a drilling tool according to the invention with left-hand twist.
Figure 2:
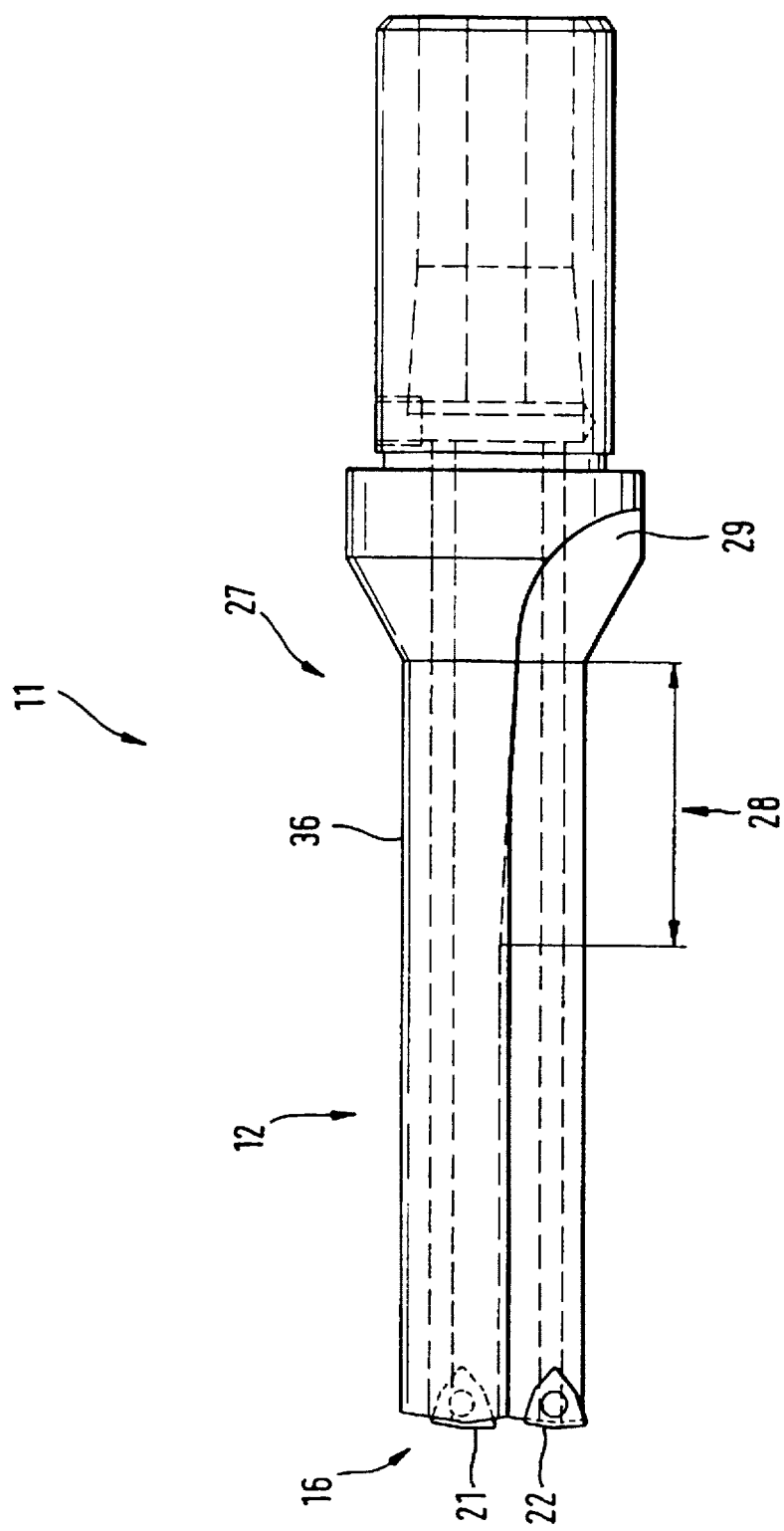
FIG. 2 shows a schematic side view of a drilling tool according to the invention with a core rise.
Figure 3:
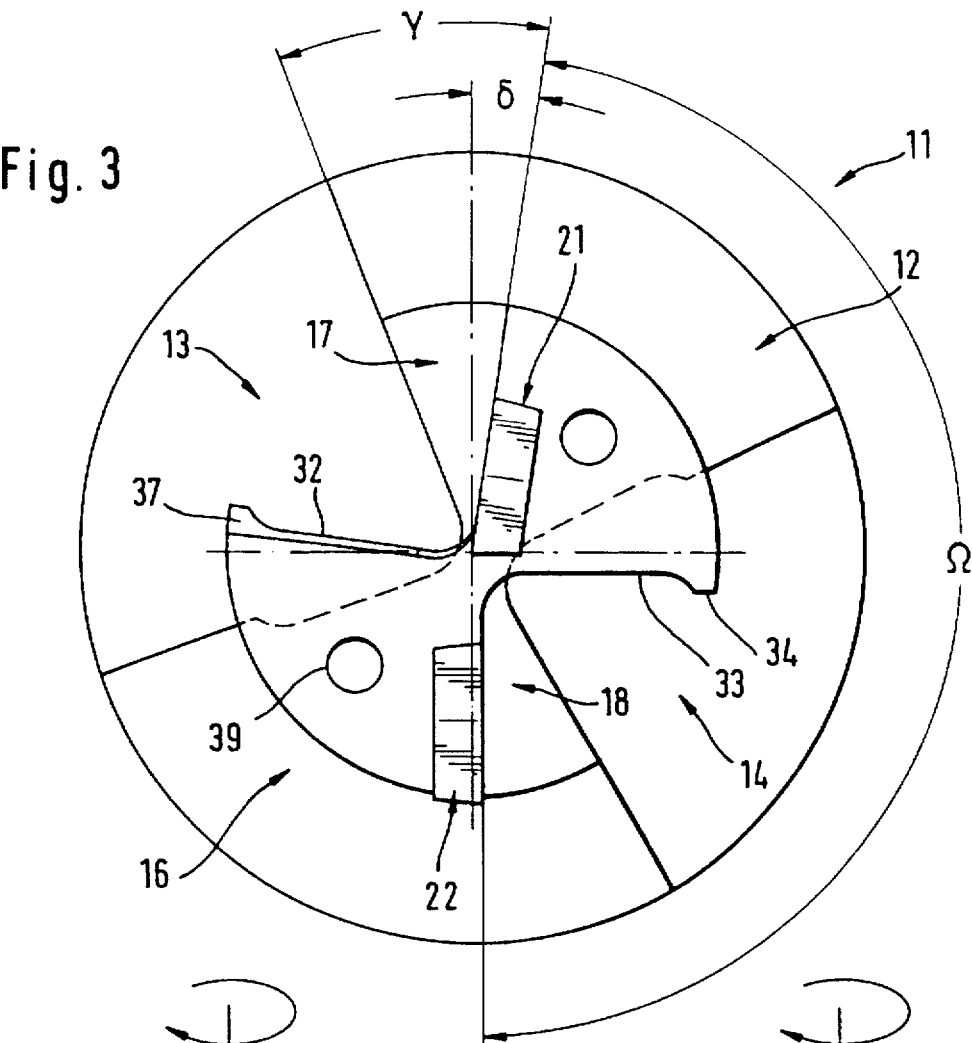
FIG. 3 shows a plan view of the drilling tool according to the invention according to FIG. 1.
Figure 4:
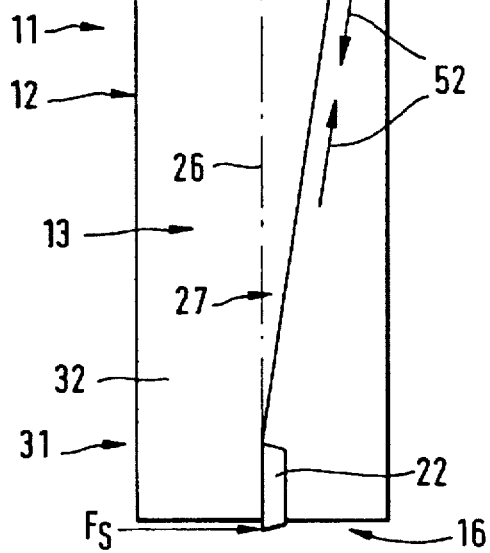
FIG. 4 shows a schematic representation of a drilling tool with right-hand twist.
Figure 5:
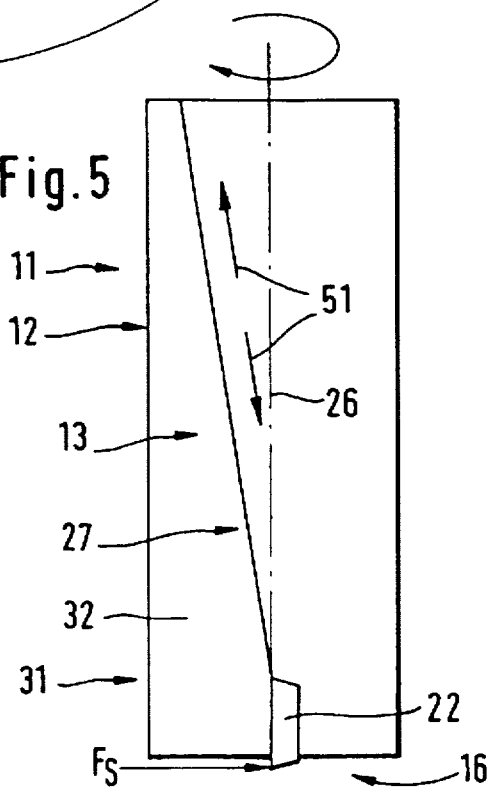
FIG. 5 shows a schematic representation of the drilling tool according to the invention with left-hand twist.
Figure 6:
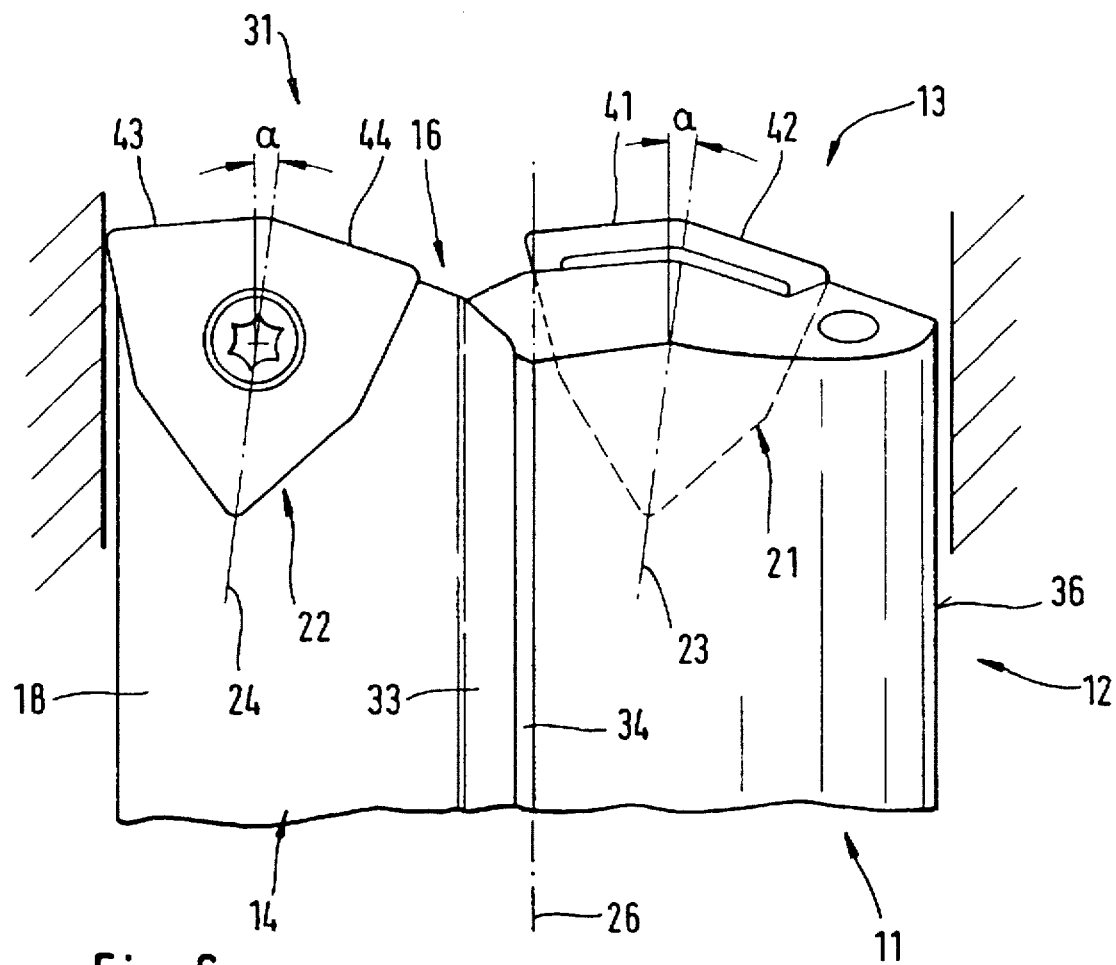
FIG. 6 shows a drilling tool according to the invention with symmetrical rotation of the cutting inserts relative to a drill longitudinal axis.
Figure 7:
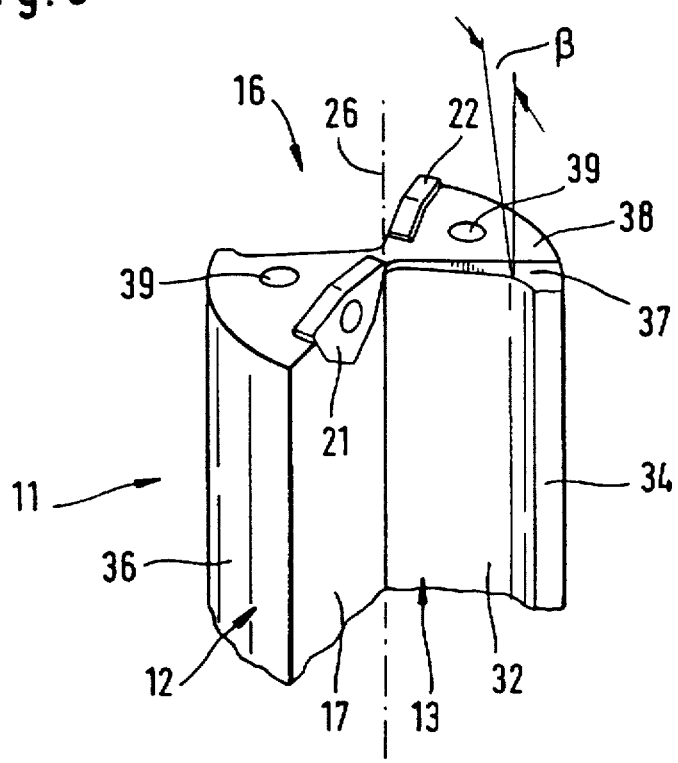
FIG. 7 shows a perspective view of a front area of the drilling tool according to the invention.

FIGS. 1, 2 and 4 to 6 show a drilling tool 11 according to the invention. The drilling tool 11 is preferably a 3.5×D drill, in which case the features according to the invention may likewise be applied to other short-hole drills or drilling tools. A drill shank 12 has two diametrically opposite, axially extending recesses 13, 14 which serve to remove the drill chips. The recesses 13, 14 are offset relative to one another essentially by 180°. At an end face 16 of the drilling tool 11, one indexable insert 21, 22 is arranged in each case in a receptacle in a boundary wall 17, 18 of each recess 13, 14. These indexable inserts 21, 22 are advantageously of hexagonal design, their engaged cutting edges 41, 42, 43, 44 enclosing an angle between 150° and 170°. Each indexable insert 21, 22 is fastened with a clamping bolt in a shiftable and interchangeable manner. The indexable inserts 21, 22 are in each case in cutting engagement with two cutting edges 41, 42 and 43, 44, the indexable insert 21 cutting an area adjoining the drill longitudinal axis 26 and overlapping the latter to a small extent, and the indexable insert 22 cutting the bore area which reaches up to the drill periphery. The individual working areas of the indexable inserts 21, 22 overlap.

The radially inner indexable insert 21 is allocated to the recess 13, which is designated below as inner chip space. The radially outer indexable insert 22, which adjoins the outer periphery of the bore, is allocated to the outer recess 14, which is designated below as outer chip space. The indexable inserts 21, 22 are offset from one another at an angle of 172° as viewed radially to the drill longitudinal axis 26. This angular arrangement has the advantage that the inner chip space 13 is designed to be open or enlarged, which benefits the chip flow on the inner indexable insert and dampens vibrations. At each indexable insert 21, 22, an angle bisector 23, 24 is inclined at the same angle relative to a drill longitudinal axis 26 in a range between 0° and 10°. The indexable-insert arrangement 21, 22 has been intentionally selected in such a way that the sum of the radial force components resulting from all effective cutting edges 41, 42, 43, 44 in engagement is different from zero and points to the outside with the outer insert in the directional area of the cutting edge. This enables the drill 11 to work with a somewhat larger diameter during the drilling operation. This results in the advantage that the drilling tools 11 cannot jam in the bores and no withdrawal scores occur in the bore wall when pulling out the drill shank 12. In a 3.5×D drilling tool 11 having a radial angular arrangement of the indexable inserts 21, 22 of 172°, a common rotation α of the indexable inserts 21, 22 by 4° relative to the drill longitudinal axis 26 has proved successful.

According to the invention, the drilling tool 11 has an enlarged cross-section in the rear area 27 of the core of the drill shank 12 in order increase the rigidity of the basic body. Such a core rise 28 is provided in the inner and outer chip space 13, 14. The outside diameter of the drill shank 12 remains constant. In the rear area 27 up to the chip runout 29, the profile cross-section of the drill shank 12 may increase by up to 10% relative to the front profile cross-section 31 close to the indexable inserts 21, 22, a range of 5% to 20% preferably being provided. The core rise 18 may be provided either on the boundary wall 17, 18 or on an opposite side surface 32, 33 of the inner and outer chip space 13, 14 as well as on the boundary inner wall 17, 18 and the side surfaces 32, 33. The core rise 28 is advantageously a continuous rise which starts in the centre and rear area 29 of the drill shank 12. A smooth transition is advantageously provided here from the side surfaces 32, 33 and boundary walls 17, 18 to the core rise 28 so that effective discharge of the chip from the inner and outer chip space 13, 14 is retained and the narrowing of the chip space does not lead to the excitation of vibrations.

Alternatively, provision may be made for the core rise 28 to have a discontinuous course as viewed in cross-section. See FIGS. 9a–9i. Despite the relatively small rise of the cross-sectional enlargement, a substantial increase in the rigidity in the bottom area 27 of the drill shank 12 can be created in the cross-section by the increase in the section modulus and the moment of inertia.

The configuration according to the invention of the cross-sectional profile of the drill shank 12 is provided in order to further increase the rigidity of the drilling tool 11. The side surface 32 and boundary wall 17 of the inner chip space 13 are arranged essentially at right angles to one another. Likewise, the boundary wall 18 and side surface 33 of the outer chip space 14 are arranged essentially at right angles to one another. The two chip spaces 13, 14 are arranged diametrically opposite one another. On account of the left-hand twist according to the invention, which is explained below, the inner and outer chip spaces 13, 14 are twisted over the course of the drill shank 12 by an angle γ in the range between 15° and 40°, 29° preferably being provided for a left-hand twist of about 3°. A large chip space which permits effective chip discharge can therefore be created over the entire area of the drill shank 12.

To further increase the rigidity of the profile cross-section of the drill shank 12, provision is made according to the invention for a stiffening bead 34 to be formed on the side surfaces 32, 33 of the inner and outer chip space 13, 14. This stiffening bead 34, which is arranged in the outer marginal area of the side surfaces 32, 33 and preferably extends over the entire length of the drill shank 12, permits an increase in the section modulus and the moment of inertia. This additionally makes possible the configuration of the large inner and outer chip space 13, 14. The stiffening bead 34 is designed in a strip shape and has a slight elevation relative to the side surface 32, 33. A smooth transition is created in the transition area from the side surface 32, 33 to the outer stiffening bead 34. The outer marginal area of the stiffening bead 34 directly adjoins a circumferential surface 36 of the drill shank 12. The elevation of the stiffening bead 34 relative to the side surface 32, 33 may be in the range of a few millimeters. The width of the stiffening bead 34 is designed to be small relative to the side surface 32, 33 so that the size of the chip space 13, 14 is essentially retained.

According to the invention the drilling tool 11 has a left-hand twist. This left-hand twist may be at an angle δ between 0.1° and 20°, a left-hand twist having an angle δ of 2° to 4° preferably being provided. Compared with the hitherto conventional right-hand twist of such drilling tools disclosed by the prior art, the drilling tool 11 now designed with a left-hand twist has the advantage that tensile stresses according to arrow direction 51 occur in the drill shank 12 during the engagement of the indexable inserts 21, 22. Substantial damping of vibrations in the drilling tool 11 may thereby be provided. This becomes particularly clear if the point of engagement of the indexable inserts 21, 22 is considered as a clamping point or bearing point, as already known from mechanics, and is shown in comparison in FIGS. 4 and 5. The indexable inserts 21, 22 are pulled over the clamping point or bearing point in the drilling tool 11 having left-hand twist and are not pressed against the clamping point or bearing point as in the hitherto known drilling tool having right-hand twist, which leads to compressive stresses according to arrow direction 52. It is thus understandable that a vibration-damping cutting action takes place on account of the left-hand twist. This becomes clear in particular when the bottom of the drill hole is considered, where no chatter marks occur, in contrast to a drill having right-hand twist. At the same time, the bore can have a higher surface quality due to the arrangement of the left-hand twist, since during a vibration-dampened cutting action no radial undefined forces act on the drill shank and deflect the latter in an irregular manner, but a cutting force occurs merely at the bottom of the drill hole, which cutting force permits a continuous direction of movement of the drilling tool 11 in the drill longitudinal axis 26.

On account of the small rise of the left-hand twist, the conveying action of the inner and outer chip space 13, 14 is retained so that there is still an optimized chip flow. The drilling tool 11 according to the invention, to dampen vibrations and to increase the cutting force and cutting capacity, therefore has a left-hand twist, a core rise 28, an enlarged inner and outer chip space 13, 14 and thus an optimum cross-sectional profile of the drill shank 12 as well as a stiffening bead 34. Alternatively, provision may also be made for one of the aforementioned features to be used on its own or in any desired combination with one or more features to improve the rigidity and to dampen vibrations.

Furthermore, to optimize the chip flow, provision is made according to the invention for an edge cut 37 arranged at the side surface 32 to be made very small. The sloping surface shown in FIG. 6 in the front area 31 of the drill shank 12 has a negative axial angle β and forms the edge cut 37. The reduction in the edge cut 37 compared with the edge cut 37 previously extending over a quarter of the front area 31 along the drill longitudinal axis 26 to the rear area 27 has the advantage that the narrowing of the chip space is reduced to a minimum and has no effect on the chip flow. It has been found that, on account of the narrowing of the chip space due to the edge cut, the chip is pressed against the bore wall in a central area of the drill shank 12. This means that additional forces in turn act on the drill and deflect the latter. The drilling operation or cutting operation is consequently disturbed so that both the cutting force and the passive force and thus the resulting force is adversely affected.

Provision may likewise be made for the edge cut 37 to be provided merely as a narrow bevel or to be completely dispensed with so that further damping of vibrations can thereby be achieved during the drilling process.

For cooling the drilling tool 11 during the drilling operation, two liquid bores 39 are provided on account of the configuration of the large inner and outer chip space 13, 14, which liquid bores extend axially through the drilling tool 11 and lie in the solid cross-section, formed between the inner chip space 13 and outer chip space 14, of the drill shank 12. The cooling liquid can thereby flow off via the minor flank 38 and directly cool the indexable inserts 21, 22 lying behind it as viewed in the direction of rotation.

In the embodiment shown in FIGS. 8a–8h, the drill has a discontinuous left-hand twist. This enables the main inertia axis to turn in at an earlier moment in the plane of the force component having the greatest vibration potential.

I claim:

1. A drilling tool for boring into solid metal material, comprising:
   a drill shank (12) for boring into solid metal material having a longitudinal axis (26) and an end face (16), at least one axially extending recess (13, 14) and at least two indexable inserts (21, 22), in which said indexable inserts are arranged at different radial distances from said longitudinal axis (26), are at least similar geometrically, have working areas that overlap, and have two cutting edges (41, 42; 43, 44) that are of the same length, are inclined adjacent to one another, are arranged at an obtuse angle to one another, and are in cutting engagement simultaneously,
   a radially inner indexable insert (21) slightly overlapping said drill axis (26) with one engaged cutting edge (41), a radially outer indexable insert (22) forming a drill diameter with an engaged cutting edge (43), and at least one angle bisector (23, 24) of said cutting edges (41, 42; 43, 44) being inclined at an angle (α) relative to said longitudinal axis (26), and in which
   a front area (31) of said drill shank (12) for boring into solid metal material has a left-hand twist relative to a rear area (27) of said drill shank (12) as viewed in a direction of drilling rotation.

2. The drilling tool according to claim 1, in which said left-hand twist runs continuously from said front area (31) to said rear area (27) of said drill shank (12).

3. The drilling tool according to claim 1, in which said left-hand twist runs discontinuously from said front area (31) to said rear area (27) of said drill shank (12).

4. The drilling tool according to claim 1, in which said left-hand twist is at an angle in the range between 2 degrees and 6 degrees.

5. The drilling tool according to claim 1, in which said two cutting edges (41, 42; 43, 44) of said indexable inserts (21, 22) have angle bisectors (23, 24) that are rotated by an angle 0 degrees to 10 degrees.

6. The tool according to claim 1, in which said indexable inserts (21, 22) are arranged at an angle of between 165 degrees and 185 degrees radially with respect to said drill axis (26).

7. The drilling tool according to claim 1, further comprising a cross-sectional area (28) that is enlarged relative to a cross-section of said front area (31), in an area of said drill shank (12) opposite said end face (16) of said drill shank (12).

8. The drilling tool according to claim 7, in which a core rise (28) forming said cross-sectional enlarged area (28) is provided in a rear area of said drill shank (12) on a boundary wall (17, 18) of said recess (13, 14) accommodating said indexable insert (21, 22).

9. The drilling tool according to claim 7, in which a core-rise (28) forming said cross-sectional enlarged area (28) is provided in a rear area of said drill shank (12) on a side surface (32, 33) of said recess (13, 14) opposite said indexable inserts (21, 22).

10. The drilling tool according to claim 7, in which a core rise (28) forming said cross-sectional enlarged area (28) is arranged on at least one side surface (32, 33) of said recess (13, 14).

11. The drilling tool according to claim 7, in which a core rise (28) forming said enlarged area (28) is arranged on at least one boundary surface (17, 18) of said recess (13, 14).

12. The drilling tool according to claim 7, in which a core rise (28) forming said cross-sectional enlarged area (28) is arranged on at least one boundary surface (17, 18) and on at least one side surface (32, 33) of said recess (13, 14).

13. The drilling tool according to claim 7, in which a core rise (28) forming said cross-sectional enlarged area (28) extends over less than a rear half of said drill shank (12).

14. The drilling tool according to claim 7, in which a core rise (28) forming said cross-sectional enlarged area (28) rises at a shallow angle.

15. The drilling tool according to claim 7, in which a core rise (28) forming said cross-sectional enlarged area (28) rises continuously.

16. The drilling tool according to claim 7, in which a core rise (28) forming said cross-sectional enlarged area (28) rises discontinuously.

17. The drilling tool according to claim 7, in which a core rise (28) forming said cross-sectional enlarged area (28) comprises less than 20 percent of said cross-section of said front area (31) of said drill shank (12).

18. The drilling tool according to claim 7, in which a core rise (28) forming said cross-sectional enlarged area (28) is less than 10 percent of said cross-section of said front area (31) of said drill shank (12).

19. The drilling tool according to claim 7, in which a core rise (28) forming said cross-sectional enlarged area (28) is less than 5 percent of said cross-section of said front area (31) of said drill shank (12).

20. The drilling tool according to claim 7, further comprising a smooth transition between said front area (31) of constant cross-section and said rear area (27) of said drill shank (12).

21. The drilling tool according to claim 1, further comprising a stiffening bead (34) on a side surface (32, 33) of said recess (13, 14) opposite said indexable inserts (21, 22), adjoining a circumferential surface (36) of said drill shank (12) and extending axially at least partly over an entire length of said recess (13, 14).

22. The drilling tool according to claim 21, in which said stiffening bead (34) extends over an entire length of said drill shank (12).

23. The drilling tool according to claim 21, in which said stiffening bead (34) is narrow in relation to a width of said side surface (32, 33).

24. The drilling tool according to claim 21, in which said stiffening bead (34) increases at least one of the moment of inertia and the section modulus of said drill shank (12).

25. The drilling tool according to claim 21, in which an outer wall zone of said stiffening bead (34) forms part of said circumferential surface (36) of said drill shank (12) and provides a guide surface.

26. The drilling tool according to claim 21, in which said stiffening bead (34) projects by less than 3 mm. relative to said side surface (32, 33) of said recess (13, 14).

27. The drilling tool according to claim 1, further comprising a narrow sloping surface (37) in said front area (31) of said drill shank (12) on at least one side surface (32, 33) of said recess (13, 14) opposite said indexable insert (21, 22).

28. The drilling tool according to claim 27, in which said sloping surface (37) has a negative axial angle.

29. The drilling tool according to claim 27, in which a transition between said sloping surface (37) and said side surface (32, 33) of said recess (13, 14) is substantially smaller than a length of said indexable inserts (21, 22) extending in a direction of said drill longitudinal axis (26).

30. The drilling tool according to claim 26, in which said sloping surface (37) comprises a narrow bevel.

31. The drilling tool according to claim 1, in which said recesses (13, 14) are essentially diametrically opposite each other and have boundary walls (17, 18) and side surfaces (32, 33) arranged essentially at right angles to each other at least partly along said drill shank (12).

32. The drilling tool according to claim 31, further comprising roughly quadrant-shaped solid cross-sections of said drill shank (12) that lie between said recesses (13, 14) and include at least one cooling-liquid feed (39).

33. The drilling tool according to claim 31, in which said boundary walls (17, 18) and said side surfaces (32, 33) are essentially planar.

* * * * *